May 25, 1926.
C. R. CHURCHMAN
1,586,068
MACHINE FOR ROOFING TELEPHONE AND TELEGRAPH POLES
Filed June 26, 1925     2 Sheets-Sheet 1
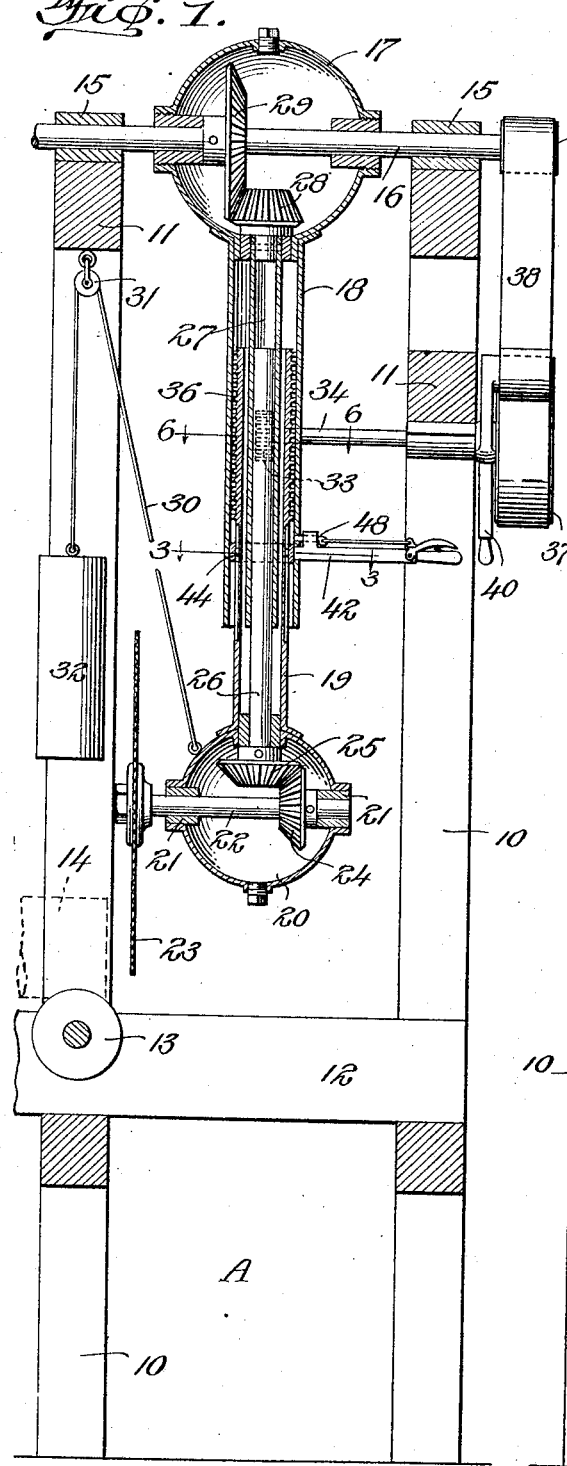
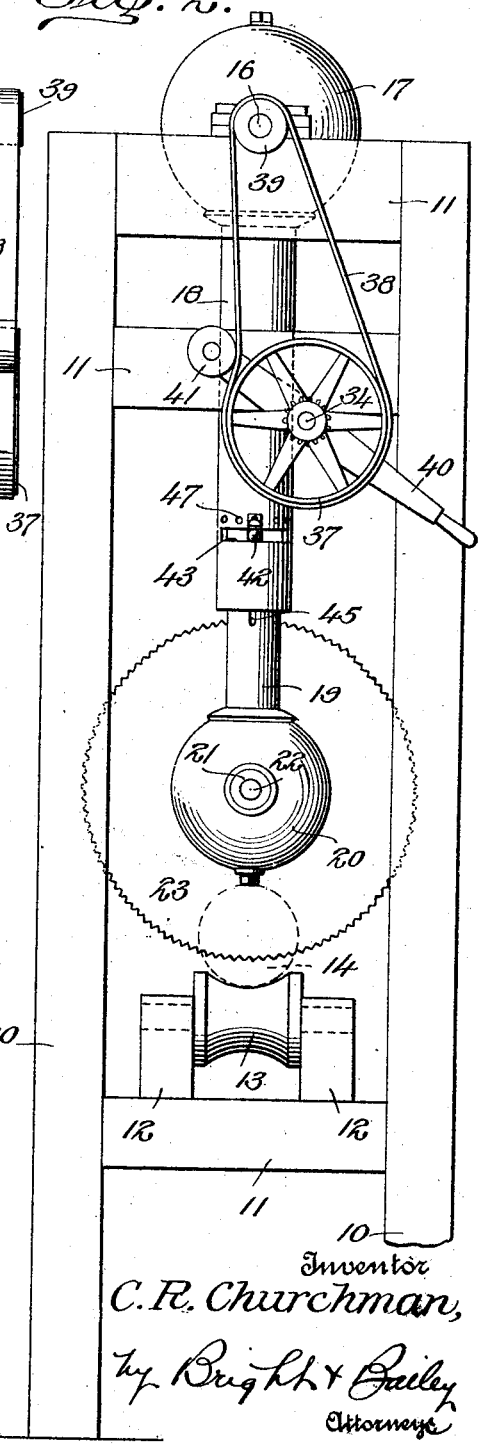
Inventor
C. R. Churchman,
by Bright & Bailey
Attorneys May 25, 1926. 1,586,068
C. R. CHURCHMAN
MACHINE FOR ROOFING TELEPHONE AND TELEGRAPH POLES
Filed June 26, 1925  2 Sheets-Sheet 2
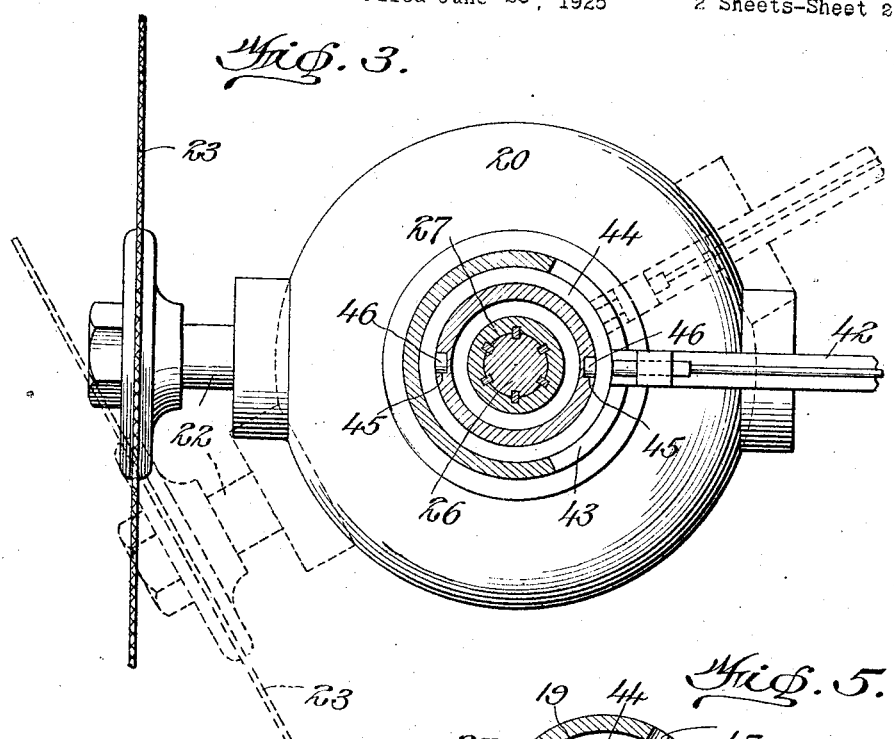
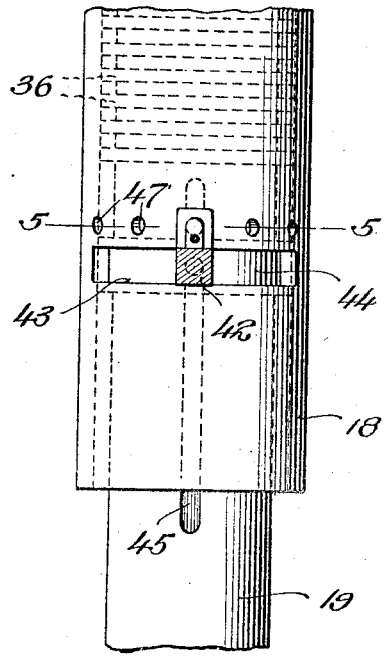
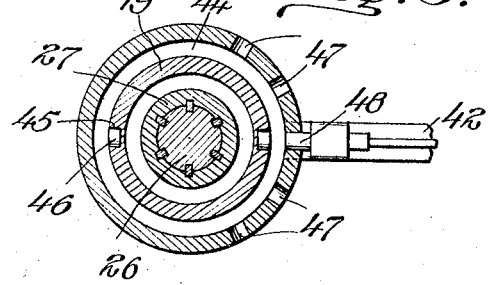
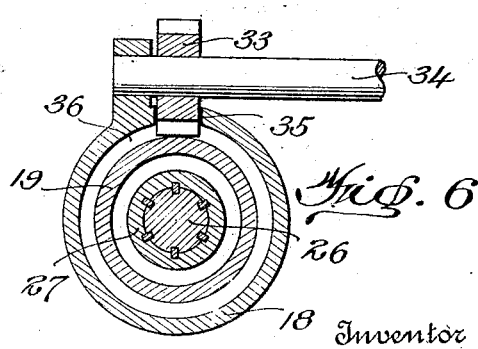
Inventor
C. R. Churchman,
by Bright & Bailey
Attorneys Patented May 25, 1926.

1,586,068

UNITED STATES PATENT OFFICE.

CHARLES R. CHURCHMAN, OF SHREVEPORT, LOUISIANA.

MACHINE FOR ROOFING TELEPHONE AND TELEGRAPH POLES.

Application filed June 26, 1925. Serial No. 39,842.

My invention relates to a machine which, while capable of other uses, is particularly intended for "roofing" telephone and telegraph poles, that is, pointing or tapering the upper ends of such poles to assure their longevity under the deteriorating effects of the elements, my object, generally speaking, being to provide a labor saving machine for the purpose mentioned which is of relatively simple, compact, inexpensive construction, and through the instrumentality of which "roofing" operations on poles may be accomplished cheaply and with rapidity and efficiency.

With the foregoing and other purposes in view, my invention consists in the novel features of construction, combination and arrangement of parts as will be hereinafter more fully described, illustrated in the accompanying drawings and defined in the appended claims.

In the drawings, wherein like characters of reference denote corresponding parts in the different views:—

Fig. 1 is a longitudinal section through the essential parts of a machine embodying my invention;

Fig. 2, an end view of the machine shown in Fig. 1;

Fig. 3, an enlarged horizontal section on the line 3—3 of Fig. 1;

Fig. 4, an enlarged elevation, partly in section showing the structural arrangement whereby the saw is angularly adjustable;

Fig. 5, a section on the line 5—5 of Fig. 4; and

Fig. 6, a section on the line 6—6 of Fig. 1.

As shown in Figures 1 and 2 my machine consists essentially of a suitable frame A, composed in this instance of a plurality of longitudinally and transversely spaced upright members 10 connected by transverse and longitudinally extending members 11 and 12, respectively.

Suitably mounted on frame A, near the bottom thereof, is one or more rollers 13 on which a telephone or telegraph pole 14, indicated by dotted lines in Figures 1 and 2, is adapted to rest whereby it may with facility be moved longitudinally or rotated to permit it to be operated on by the "roofing" mechanism which will now be described in detail.

Mounted in suitable bearings 15 at or near the top of frame A is a longitudinally extending shaft 16 on which is rotatably mounted a housing 17 having rigid therewith and depending therefrom a tube 18 within which is a second tube 19, longitudinally movable and rotatable with respect to tube 18. Tube 19 projects downward below the lower end of tube 18 and carries at its lower end, rigid therewith, a housing 20 having bearings 21 in which is mounted a horizontal shaft 22, one end of which extends outwardly of said housing and has affixed thereto a circular saw 23.

On shaft 22 is affixed a bevel gear 24 which meshes with a similar gear 25 on a shaft 26 which shaft extends upwardly into tube 19 where it is received within a hollow shaft 27 extending downwardly from housing 17, said hollow shaft being mounted in a suitable bearing carried by the housing 17 and having affixed thereto a bevel gear 28 which meshes with a similar gear 29 affixed to the drive shaft 16. A splined connection shown in Figures 3, 5 and 6 is provided between shaft 26 and hollow shaft 27 whereby these shafts may be moved longitudinally with respect to one another, but are caused to rotate in unison in any longitudinally adjusted position of one with respect to the other. Thus it is apparent that when rotation is imparted to drive shaft 16, which rotation may be effected in any desired manner, the gears 29, 28, shafts 27, 26 and gears 25, 24 are caused to rotate, thereby rotating saw 23.

A cable 30 is trained over a pulley 31 mounted at or near the upper end of frame A, and one end of this cable is attached to housing 20 while its other end has attached thereto a weight 32, so that normally tube 19 and shaft 26 are maintained at their uppermost limits of movement with respect to tube 18 and hollow shaft 27, respectively. Means is provided, however, whereby power may be taken from shaft 16 to effect downward movement of tube 19 and shaft 26 thereby to move the saw 23 downward into contact with the end of a pole 14 supported on the roller or rollers 13 to effect "roofing" of the same, said means consisting in this instance of a pinion 33 affixed to a shaft 34 and extending through a suitable opening 35 in the tube 18 into mesh with circular rack teeth 36 about the exterior of tube 19. Shaft 34 is mounted in suitable bearings on the tube 18 and frame A, respectively, and has affixed thereto a pulley 37 connected by a loose belt 38 with a pulley 39 on shaft 16, so that normally shaft 34 is not rotated during rotation of shaft 16. On one end of a pivoted lever 40 is mounted an idler pulley 41, however, so that by swinging said lever said idler pulley may be moved into engagement with belt 38 to tighten same and cause rotation of pulley 37 which in turn will rotate shaft 34 and pinion 33 and, because of the engagement of said pinion with the rack teeth 36, tube 19 will be forced downward as is manifest, forcing saw 23, as it rotates, through the pole. Immediately pressure is removed from lever 40 the belt 38 becomes loose and weight 32 draws the saw upward into position to make another cut.

It is necessary, in order that the end of a pole 14 may be cut to a point, that is "roofed" or tapered, that the saw 23 be adjustable angularly with respect to a pole supported on the roller or rollers 13, and this is accomplished by means of a lever 42 passing through a circumferential slot 43 in tube 18 and carrying at its inner end a band 44 encircling tube 19 and keyed thereto, so that by swinging said lever in a horizontal plane tube 19 is rotated and as a consequence housing 20 and saw 23 may be angularly adjusted to any position desired within the limits permitted by the extent of slot 43. Elongated key-ways or slots 45 in the tube 19 which receive keys or pins 46 carried by the band 44 permit up and down movements of tube 19 and the parts carried thereby with respect to tube 18 irrespective of the rotated relation of tube 19 with respect to tube 18, while the circular formation of the rack teeth 36 assures an operative engagement of pinion 33 with said teeth irrespective of angular adjustments that may be imparted to tube 19 by lever 42.

Formed in tube 18 adjacent to slot 43 is a plurality of circumferentially spaced apertures 37 engageable by a latch member 48 carried by the lever 42 whereby said lever may be locked against horizontal swinging movement and tube 19 and saw 23 thus held securely in different angularly rotated positions to which they may be adjusted with respect to tube 18.

In the operation of my machine a pole 14 to be roofed is placed on the roller or rollers 13 in position with an end portion thereof underlying saw 23. Lever 42 then is manipulated to adjust the saw as shown by dotted lines in Fig. 3, so that it will cut the pole at a desired angle. Lever 40 then is manipulated to cause rotation of pinion 33 and thus force the saw downward so that it will cut through the pole. Upon completion of one cut lever 40 is released whereupon weight 32 elevates the saw to a position in readiness to make another cut. In the meantime the pole is rotated to present a new portion thereof to the saw and this is repeated as many times as necessary until the desired pointing or tapering of the end of the pole has been effected.

From the foregoing description considered in connection with the accompanying drawings it is believed that the construction, operation and advantages of my machine will be fully understood. It is desired to point out, however, that various changes and desirable additions may be made in and to the structure shown within the spirit and scope of my invention as defined in the appended claims.

I claim:

1. A machine of the class described including a drive shaft, a saw supported by and driven from said shaft, said saw being movable towards and away from said shaft, means normally holding said saw at its limit of movement in one direction with respect to said shaft, and means taking power from said shaft for moving said saw in the other direction with respect to said shaft.

2. A machine of the class described including a drive shaft, a housing mounted on said drive shaft, a tube depending from said housing, a second tube longitudinally slidable and rotatable within said first tube, telescoped shaft sections extending through said tubes, a driving connection between one of said shaft sections and said drive shaft, a housing carried by said second tube, a shaft journaled in said last mentioned housing, a saw carried by said last mentioned shaft, and a driving connection between said last mentioned shaft and the other of said telescoping shaft sections.

3. A machine of the class described including a drive shaft, a tube supported by and depending from said shaft, a second tube longitudinally slidable and rotatable within said first mentioned tube, a saw carrying shaft supported by said second mentioned tube, means for rotating and means for longitudinally sliding said second mentioned tube with respect to said first tube to impart corresponding adjustments to said saw carrying shaft, and a constant driving connection between said drive shaft and said saw carrying shaft.

4. A machine of the class described including a drive shaft, a tube supported by and depending from said shaft, a second tube longitudinally slidable and rotatable within said first mentioned tube, a saw carrying shaft supported by said second mentioned tube, a pinion driven from said drive shaft for moving said second mentioned tube longitudinally with respect to said first mentioned tube, a lever for rotating said second mentioned tube with respect to said first mentioned tube, means to lock said lever against movement to maintain desired rotated adjustments of said second mentioned tube, and a constant driving connection between said drive shaft and said saw carrying shaft.

In testimony whereof I hereunto affix my signature.

CHARLES R. CHURCHMAN.